Oct. 23, 1956  F. A. SCHUMACHER  2,768,048
BOTTLE RACK FOR REFRIGERATING APPARATUS
Filed Dec. 21, 1953.

INVENTOR.
FRANK A. SCHUMACHER
BY
HIS ATTORNEY

United States Patent Office 2,768,048
Patented Oct. 23, 1956

2,768,048
BOTTLE RACK FOR REFRIGERATING APPARATUS

Frank A. Schumacher, Erie, Pa., assignor to General Electric Company, a corporation of New York Application December 21, 1953, Serial No. 399,386

3 Claims. (Cl. 312—351)

My invention relates to household refrigerating apparatus and more particularly to means for supporting bottles within such apparatus.

In their normal use a wide variety of food products are stored in household refrigerators. To support most of these foods the ordinary horizontal shelving arrangements are quite satisfactory. For example, foodstuffs such as meats and vegetables may be reached very easily if supported on such shelves. However, if it is attempted to store large bottles, such as the common quart soda bottle, on horizontal shelves a definite problem is presented for these bottles are so tall that a very wide spacing between the shelves must be made if they are to be accommodated. This width of spacing between the shelves is otherwise unnecessary and is undesirable because it tends to waste the available space within the refrigerator. Additionally, when the bottles are stored on the horizontal shelves, they tend to block access to other foodstuffs because of their rather large bulk. Of course, it is possible to store them on the rear of the shelves; but if they are there stored, they are then difficult to remove because of their bulk. Moreover, to store bottles on the horizontal shelves takes space which may be better used for irregularly shaped foods.

It is, therefore, an object of my invention to provide a new and improved means for storing bottles within household refrigerating apparatus.

A more specific object of my invention is to provide a new and improved bottle rack which may be mounted on the walls or the door of a household refrigerator.

My invention also has as its object the provision of a bottle rack for use in household refrigerating apparatus, which may be folded out of the way when not in use.

In carrying my invention into effect I employ household refrigerating apparatus having a storage compartment defined by a rear and side walls. On one of these walls I mount my new and improved bottle rack which includes a generally U-shaped bail member having a bight portion and a pair of leg portions. This bail member is itself pivotally supported by means of a base member which is affixed to the aforesaid wall. Further included in the rack are stop means which engage the bail member to support it in a bottle holding position, and in this position the bail member cooperates with the base member to form a cradle operative to support a bottle. Preferably in my preferred embodiment the base member is provided with a pair of recesses, and these recesses accommodate transversely extending projections formed on the end of the bail leg portions in order to pivotally mount the bail. Also in my preferred embodiment the stop means are formed as part of the base member, a pair of spaced shelf portions being provided therein for that purpose.

The novel features which I believe to be characteristic of my invention are set forth with particularity in the appended claims. My invention itself, however, both as to its organization and method of operation may best be understood by reference to the following description taken in conjunction with the accompanying drawing in which:

Figure 1:
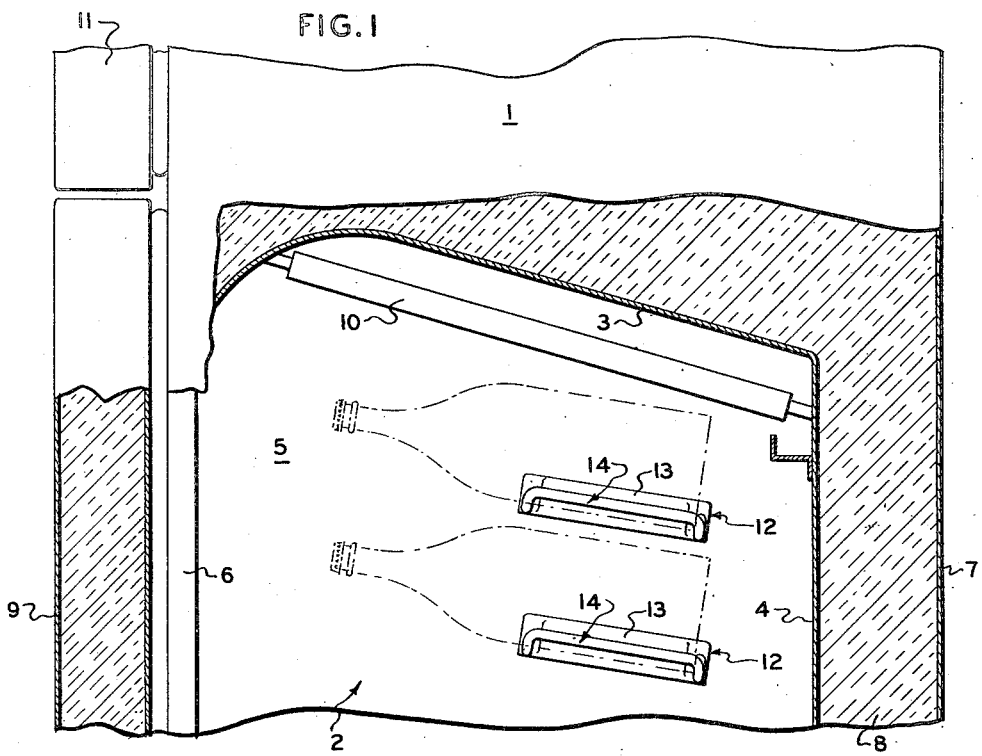
Fig. 1 is a fragmentary view in partial section of a household refrigerator incorporating a preferred embodiment of my new and improved bottle rack.

Referring now to Fig. 1 I have shown therein a household refrigerator 1 in which a fresh food compartment 2 is defined by an inner liner or shell 3. The inner liner includes a rear wall 4, side walls 5 and top and bottom walls (one side wall and the bottom wall not shown), and as is customary in refrigerator construction is open at its front to provide an access opening 6. The liner 3 is surrounded by an outer panel or shell 7 and is insulated therefrom by a mass of insulation 8. The opening 6 to the storage compartment 2 defined by liner 3 is closed by an insulated door 9 which is hinged to the outer panel 7. An evaporator 10 connected in a standard refrigeration circuit is positioned in the top of the food storage compartment in order to refrigerate or cool it. Although such is not necessary to my invention the refrigerating apparatus here shown also includes a frozen food chamber positioned above the fresh food compartment to which access is provided through a separate door 11.

Within the food storage compartment defined by liner 3 I have mounted a plurality of new and improved bottle racks constructed in accordance with my invention. These bottle racks 12 may be mounted on the rear wall of the liner or on either of the side walls thereof. They are here, however, shown as mounted on the left of the side walls 5. It is, of course, possible that the bottle racks 12 could even be mounted on the inner surface of the door 9. Such mounting, however, would not ordinarily be done because of other food storage shelves customarily provided thereon although here not shown.

Figure 2:
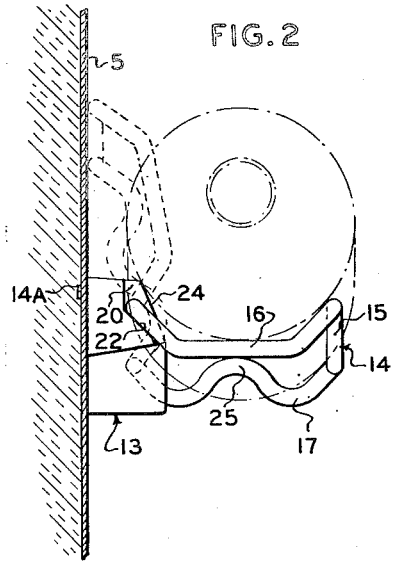
Fig. 2 is a front view of my new and improved bottle rack showing it attached to the refrigerator wall.
Figure 3:
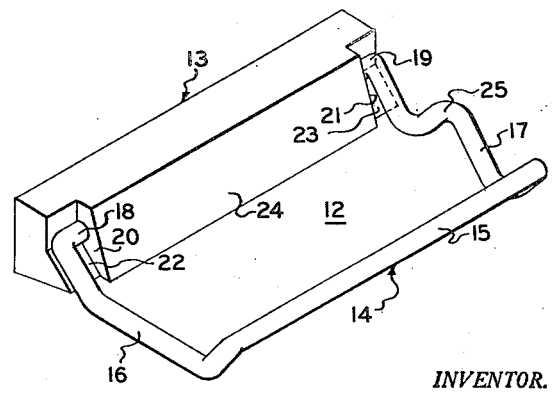
Fig. 3 is a perspective view of the bottle rack.

As may best be seen in Figs. 2 and 3, each of the bottle racks 12 includes a base member 13 and a U-shaped frame or bail member 14. The base member 13 is attached to one of the walls of the liner, as wall 5, by any suitable means such as screws 14a. Preferably as shown, the base member is mounted in an inclined position so that it extends downwardly from front to back (looking in from access opening 6). The bail member 14 is basically U-shaped and contains a bight portion 15 and a pair of leg portions 16 and 17. In my preferred embodiment the front leg 16 is of a generally dished configuration whereas the rear leg 17 is of a generally waved configuration.

In accordance with my invention these legs are so attached to the base member 13 that the bail may pivot relative to the base member. In other words the bail 14 is pivotally mounted on the base member 13. In my preferred embodiment this pivotal mounting is accomplished by means of transversely extending projections 18 and 19 provided respectively on the ends of leg portions 16 and 17 of the bail. These projections 18 and 19 are accommodated in recesses formed respectively in spaced end faces 20 and 21 provided on the base member. For a purpose to be explained hereinafter, these end faces and thereby their recesses are spaced a distance sufficient to cause a springing apart of legs 16 and 17 from their normal position when they are assembled with the base member. In other words when the bail is assembled with the base member, a spring tension is created therein. The bail member may be formed of any suitable material, as for example a strong steel wire, in order to provide this springing action.

In order to support the bail 14 in a bottle holding position, such as that shown in the diagram, stop means are provided which engage the leg portions 16 and 17. Although various means could be used to supply such a supporting stop, preferably it is supplied by means of a pair of shelf portions formed integrally with the base member. Thus as shown most clearly in Fig. 3, the base member includes spaced inclined shelf portions 22 and 23. These shelf portions 22 and 23 respectively engage the inner end of the legs 16 and 17 so as to maintain the bail in the generally horizontal position shown. This engagement between the shelf portions of the base member and the leg portions of the bail member provide a stop positively preventing downward movement of the bail from the bottle holding position.

As is illustrated in Figs. 1 and 2, when the bail 14 is in the bottle holding position, it cooperates with the front inclined face 24 of the base member to form a cradle of a size adapted to receive a bottle. When a bottle of the optimum size, as for example the common quart soda bottle, is placed in the cradle as shown in the dotted lines, it rests on the bail bight 15 and on the top edge of the face 24, and is prevented from sliding backwardly out of the cradle by means of the raised center portion 25 of the leg 17. If however a bottle somewhat smaller than the optimum size is placed within the cradle it will still be supported thereby. In the case of a smaller bottle it will contact the bail 15 as before. However instead of resting on the top edge of the face 24 it will contact the face at a somewhat lower point, and may also rest on the center part of the forward leg 16. As with the optimum size bottle the waved leg 17 will prevent it from sliding backwardly out of the cradle.

When the bottle racks 12 are not being used, it is of course desirable that they be moved out of the way so as to not waste space within the storage compartment. For this reason, as above mentioned, the bail 14 is pivotally mounted on the base member 13; and as shown in the dotted lines in Fig. 2 it may be pivoted or folded upwardly so as not to jut outwardly into the storage compartment. A manual force is sufficient to turn the bail 15 to this upward position, and in accordance with my invention the bail is maintained in this upward position by the aforementioned spring pressure therein. The spring pressure caused in the bail by the spacing of the mounting recesses causes the projections 18 and 19 to be forced thereinto so as to provide a friction contact. This friction contact is sufficient to hold the bail in its upper out-of-the-way position.

In the drawings I have shown my new and improved bottle racks as mounted at a certain angle of incline or tilt. However it should be understood that the incline could be more or less without destroying the effectiveness of my bottle racks. In fact, if it is desired to place half full bottles in the racks, it may be desirable to tilt the racks somewhat more than is shown in the drawings in order that the contents might not leak out of the top of these previously opened bottles.

From the above it will be seen that I have provided a new and improved bottle rack which includes only two members. This bottle rack is inexpensive to produce and assemble but yet is pleasing in appearance when placed within a refrigerator cabinet. Moreover it takes up very little space, and in fact can be folded out of the way when not in use. It, of course, automatically remains in this out-of-the-way position when placed therein. Further, although I have described my racks particularly with respect to the common quart size soda bottle, it should be realized that they could be changed in size so as to accommodate any size bottle.

In accordance with the patent statutes, I have described what at present is considered to be the preferred embodiment of my invention. However, it will be obvious to those skilled in the art that various changes and modifications may be made therein without departing from the invention, and it is, therefore, aimed in the appended claims to cover all such changes and modifications as fall within the true spirit and scope of my invention.

What I claim as new and desire to secure by Letters Patent of the United States is:

1. In a refrigerator having a rear and side walls defining a storage compartment, a bottle rack comprising a generally U-shaped bail member having a bight portion and a pair of leg portions, with each of said leg portions having a transversely extending projection at the end thereof, and a base member affixed to one of said walls and including a pair of spaced recesses for accommodating said projections to pivotally mount said U-shaped member, the spacing between said recesses being adapted to spring apart said leg portions from their normal position thereby to cause spring pressure in said bail member effective to maintain said bail member in a raised position when placed therein, said base member having a pair of spaced portions for engaging said legs to support said bail member in a bottle engaging position, wherein said bail member cooperates with said base member to form a cradle operative to support a bottle.

2. In a refrigerator having a rear and side walls defining a storage compartment, a bottle rack comprising a generally U-shaped bail member having a bight portion and a pair of leg portions, with each of said leg portions having a transversely extending projection at the end thereof, one of said leg portions being of a generally dished configuration and the other of said leg portions being of a generally waved configuration, and a base member affixed to one of said side walls and including a pair of spaced recesses for accommodating said projections to pivotally mount said U-shaped member, the spacing between said recesses being adapted to spring apart said leg portions from their normal position thereby to cause spring pressure in said bail member effective to maintain said bail member in a raised position when placed therein, said dished leg portion being positioned forwardly of said waved leg portion relative to said back wall and said base member and said bail member being inclined downwardly from front to rear, and said base member having a pair of spaced shelf portions for engaging said legs to support said bail member in a bottle engaging position, wherein said bail member cooperates with the adjacent portions of base member to form an inclined cradle operative to support a bottle in a tilted position.

3. In a refrigerator having a rear and side walls defining a storage compartment a bottle rack comprising a generally U-shaped bail member having a bight portion and a pair of leg portions, and a base member affixed to one of said walls and including means engaging said legs to pivotally support said bail member, said means adapted to spring apart said leg portions from their normal position thereby to cause spring pressure in said bail member effective to maintain said bail member in a raised position when placed therein, and stop means for supporting said bail member in a bottle engaging position wherein said bail member cooperates with said base member to form a cradle operative to support a bottle.

References Cited in the file of this patent
UNITED STATES PATENTS

| | | |
|---|---|---|
| 1,076,392 | Richardson | Oct. 21, 1913 |
| 1,474,295 | Shiffer | Nov. 13, 1923 |
| 2,042,517 | Ellis | June 2, 1936 |
| 2,340,645 | Creed | Feb. 1, 1944 |
| 2,577,473 | McEwen | Dec. 4, 1951 |